July 19, 1955  B. KAUL  2,713,277
METHOD OF COLD FORMING RING GEARS
Filed Sept. 2, 1950 2 Sheets-Sheet 1

Inventor
Ben Kaul
By Frease and Bishop
Attorneys

July 19, 1955  B. KAUL  2,713,277
METHOD OF COLD FORMING RING GEARS
Filed Sept. 2, 1950  2 Sheets-Sheet 2

Inventor
*Ben Kaul*
By
*Frean and Bishop*
Attorneys

United States Patent Office 2,713,277
Patented July 19, 1955

2,713,277
METHOD OF COLD FORMING RING GEARS

Ben Kaul, Warren, Ohio, assignor to Mullins Manufacturing Corporation, Salem, Ohio, a corporation of New York Application September 2, 1950, Serial No. 182,966

2 Claims. (Cl. 78—45)

The invention relates to gears, and more particularly to steel ring gears, such as bevel gears, spiral bevel gears, hypoid gears, and the like, and to the precision manufacture thereof by cold pressure forming, working, or coining.

Heretofore, precision bevel or hypoid gears have been made by hot forging a steel blank to have the general outside configuration of the finished gear. Teeth are then cut in the forged gear blank after which the same is heat treated or case hardened and then ground. The gears, in pairs, are then finished by a lapping operation. Alternately, a blank is hot forged to provide the rough tooth form, then is machined or ground and heat treated or case hardened to provide the finished gear. Still another method of making a bevel gear comprises casting a gear blank and then machining the teeth therein and heat treating the machined product.

In each of these modes of manufacture considerable metal loss is involved incident to the machining operations; numerous operations are required; warpage of the material during heat treatment or case hardening occurs in varying degree, which may either require scrapping the part or extensive finish grinding operations; and finish grinding and lapping in is very costly. Thus the cost of manufacture of a precision steel bevel gear, and the like, made in accordance with prior procedure is relatively high and the yield of finished material is relatively low.

For years there has existed in the art an unsatisfied need for some procedure of making precision steel bevel gears which would eliminate some or all of the described difficulties and which could be used for the high production manufacture of sound steel bevel gears having greater strength and greater uniformity of strength than present in steel bevel gears made in accordance with standard practice.

I have discovered that it is possible to manufacture steel bevel gears and the like by cold pressure forming a single metal blank to provide, without machining, a cold formed tooth formation therein closely approaching in shape and contour, the shape and contour desired or required in the finished article. Then after heat treatment or case hardening the cold formed gear, only a small amount of finish grinding is performed thereon to provide the finished precision product. Substantially no metal loss is involved, only a few operations are required, there is a minimum of warpage during heat treatment, finish grinding is a simple operation, and a high yield of finished material is obtained.

Accordingly, it is an object of the present invention to provide a new method of making steel bevel gears and the like by cold pressure forming.

Furthermore, it is an object of the present invention to provide a new method of making bevel gears and the like from steel ring blanks by cold pressure forming without appreciable scrap loss either in providing the desired tooth formation, or in producing finished gears of uniform shape.

Moreover, it is an object of the present invention to provide a new cold pressure forming method of making a bevel gear and the like from a steel ring blank in which the metal grain flow lines in the finished gear are generally substantially parallel to the vertical centerline of the teeth, and in which the grain fibre or flow line ends, in the tooth formation ridges and depressions, are endwise compressed to strengthen the teeth and gear against warpage and distortion during heat treatment and against failure in use.

Furthermore, it is an object of the present invention to provide a new method of making bevel gears in which the tooth formations are accurately cold pressure formed with precision to substantially the desired finished shape so as to eliminate the necessity for any machining operations or loss of metal incident thereto and to enable the teeth to be finished by an extremely light cut finish grinding operation after any required heat treating or case hardening operation.

Moreover, it is an object of the present invention to provide a new method of making steel bevel gears and the like by a cold pressure forming operation, such that the cold formed gear maintains concentricity and undergoes little, if any, warpage during subsequent heat treatment or case hardening.

Likewise, it is an object of the present invention to provide a new method of cold pressure forming a bevel gear from a ring-like blank to produce a finished gear having substantially uniform tooth strength and extreme resistance to tooth breakage in use.

Finally, it is an object of the present invention to satisfy the existing need and solve existing problems in the art of steel ring gear manufacture, to eliminate prior art difficulties in this field, generally to improve cold working procedures and cold formed steel ring gear products, and to obtain the foregoing advantages and desiderata in a simple and effective manner.

These and other objects and advantages apparent to those skilled in the art from the following description and claims may be obtained, the stated results achieved, and the described difficulties overcome by the products, methods, steps, operations, and procedures which comprise the present invention, the nature of which are set forth in the following general statements, preferred embodiments of which—illustrative of the best mode in which applicant has contemplated applying the principles—are set forth in the following description and shown in the drawings, and which are particularly and distinctly pointed out and set forth in the appended claims forming part hereof.

The nature of the discoveries and improvements in methods of making steel bevel gears and the like may be stated in general terms as preferably including the steps of providing a ring-like metal, preferably steel, blank having grain flow lines running generally in an axial direction, axially pressing the blank in a confined ring-like cavity to form teeth in one end surface of the blank thereby displacing metal from the blank zone in which the teeth are formed generally axially and inwardly of the blank to form an inturned flange having an inner diameter smaller than the inner diameter of the ring blank, and at the same time reshaping the outer periphery of the blank and providing the resultant cold worked part with dense, hard, smooth, cold worked surfaces.

The nature of the improvements in cold formed steel bevel gears and the like may be stated in general terms as comprising a precision formed, cold worked, steel bevel gear having a sound, strong, and dense metal structure, and smooth precision formed gear tooth surfaces, and having uncut grain flow lines throughout substantially parallel to the axis of the gear.

By way of example, the improved method and product of the present invention are shown somewhat diagrammatically in the accompanying drawings forming part hereof wherein.

Similar numerals refer to similar parts throughout the various figures in the drawings.

Figure 1:
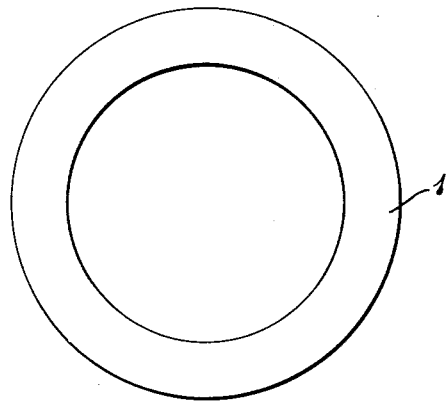
Figure 1 is a plan view of a metal ring blank used for the manufacture of the improved cold formed ring gear.

In the drawings the improved method illustrates the manufacture of a bevel gear from a steel ring blank. However, the invention is not limited to the manufacture of a bevel gear from steel having any particular or special analysis, because the procedure of the present invention is adapted to be used in forming a bevel gear or the like from steel having any desired or required analysis or alloying materials therein capable of flowing or of being cold worked under compression.

Moreover, while a bevel gear is illustrated in the drawings in connection with a description of the invention having only a small bevel or tooth angularity, nevertheless the invention comprehends the manufacture of bevel gears having any desired angularity, and also the manufacture of spiral bevel gears and hypoid bevel gears and the like.

A steel ring blank preferably cut from a steel tube is indicated at 1 in the drawings, and comprises the starting blank for the method to be described. The metal used in accordance with the present invention does not have to have any special or particular analysis in order to carry out the improved method to make the improved product, but any steel having the analysis required or desired in the finished gear may be used. For instance, ordinary carbon steel may be used, ranging from ingot iron to, say .40 carbon steel, or alloy steel may be used such as No. 4620 steel.

The amount of steel present in the blank 1 is determined by the amount of steel to be present in the finished cold formed ring gear generally indicated at 2. Since there is substantially no scrap loss in carrying out the improved method, the amount of steel present in the blank 1 is substantially the same as in the finished gear 2.

Figure 2:
Fig. 2 is a sectional view of the blank shown in Fig. 1.

As indicated, the blank 1 may be cut from tube stock and such tube stock may be formed in any desired manner, such as by hot or cold extruding from bar stock. In any event, the grain fibres or flow lines of the metal in the ring blank 1 extend generally parallel to the axis of the ring blank; that is, substantially vertical when viewing Fig. 2.

Figure 5:
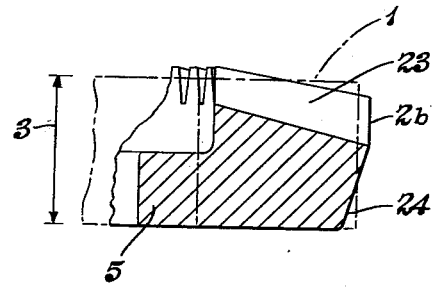
Fig. 5 is an enlarged fragmentary section of a portion of the bevel ring gear illustrated in Fig. 3.

The blank 1, in accordance with the present invention has an axial length or thickness 3 approximating the thickness of the finished gear 2. This is well shown in Fig. 5 wherein the finished cold formed gear section is illustrated in full lines with the outline of the blank 1 superimposed thereon in dot-dash lines, assuming that the axes of the blank 1 and finished gear 2 coincide. As shown in Fig. 5, the thickness 3 of the blank 1 is approximately equal to the mean height or thickness of the finished ring gear 2.

The blank 1 also has an outer diameter approximating the outer diameter of the finished gear 2. This relationship also is well shown in Fig. 5 wherein the outer diameter of the blank 1 is approximately equal to the mean outer diameter of the gear 2.

Figure 4:
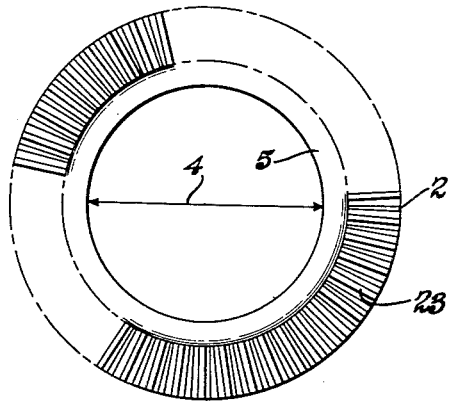
Fig. 4 is a plan view of the cold formed gear shown in Fig. 3, with portions of the gear teeth illustrated diagrammatically.
Figure 7:
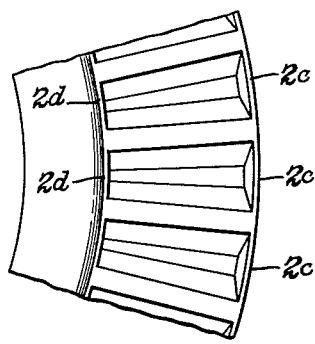
Fig. 7 is a fragmentary plan view of the part shown in Fig. 6.

In accordance with the present invention, the inner diameter of the blank 1 is somewhat larger than the finished inner diameter 4 of the formed ring gear 2 (Fig. 4). This is again well illustrated in Fig. 5, wherein the inner flange or hub 5 of the finished gear 2 has a somewhat smaller diameter than the inner diameter of the blank 1.

The stated limitations between the diameters and thickness of the ring blank and finished gear are of primary importance to the successful operation of the method of the present invention for reasons which will be described in detail below.

The blank 1 in accordance with the present invention is placed (Fig. 8) in a die cavity 6 formed by die member 7 resting on bed 7a and associated pilot and knock-out members 8 and 9. The die cavity 6 thus formed comprises an outer wall formed by cylindrical opening 10 terminating in a conical surface 11, a bottom wall formed by the upper end 12 of knock-out member 9 and an inner wall formed by the outer cylindrical surface 13 of pilot member 8.

A punch generally indicated at 14 is associated with the die member 7, and is preferably made in two parts including the main or inner punch member 15 and the gear tooth forming or outer member 16 secured to the member 15 by cap screws 17. The inner punch member is recessed at 18 so as to receive and fit over the upper end of pilot member 8 when the punch moves downward to the limit of its stroke; and the inner punch member 15 terminates in an annular ring-like punch nose 19 surrounding said recess 18. The outer punch member 16 fits tightly over the inner punch member 15 and is formed with an outer cylindrical surface 20 snugly fitting within the cylindrical wall 10 in the die member 7. The lower annular end of outer punch member 16 is formed with tooth formations 21 complementary to the tooth formations to be formed in the gear.

Figure 8:
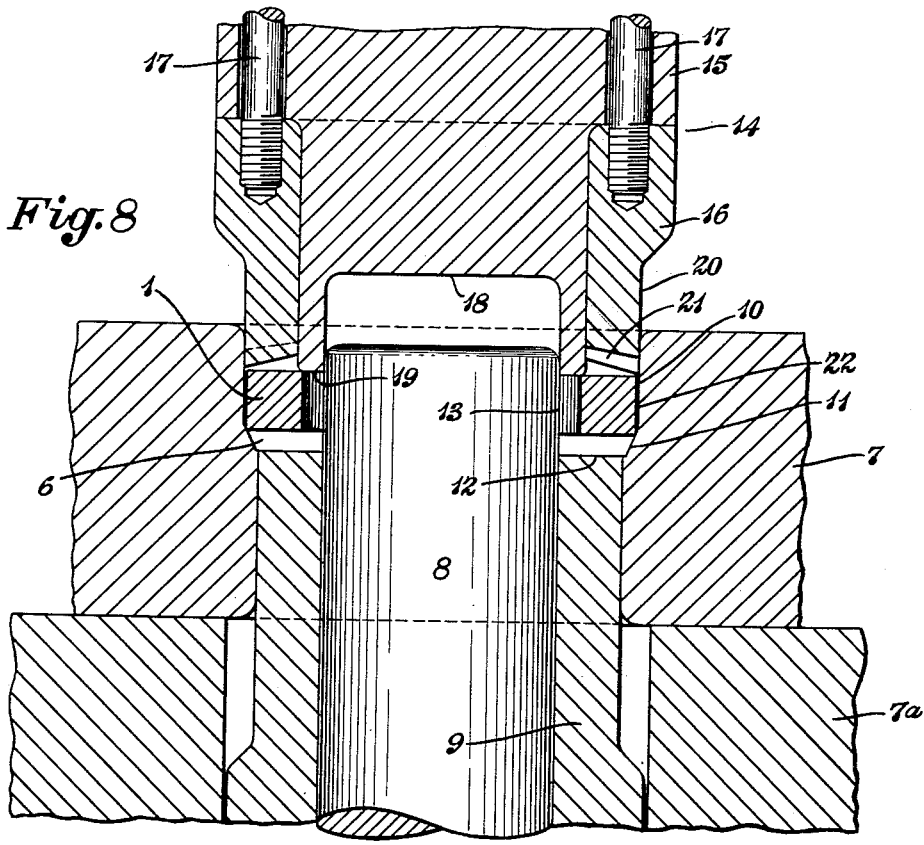
Fig. 8 is a fragmentary sectional view through dies which may be used to form the improved ring gear illustrated in Figs. 3, 4, and 5 from a blank illustrated in Figs. 1 and 2, the dies being shown in a position just prior to exerting pressure on the ring blank.

The blank 1, when placed in the die cavity 6 formed by members 7, 8, and 9, rests, as shown in Fig. 8, at its lower outer annular corner on the upper annular end of conical cavity wall 11, there being a slight clearance indicated at 22 between the outer diameter of blank 1 and the cylindrical die cavity wall 10 to facilitate entry of the blank and to facilitate an initial slight outward displacement of the metal in the upper region of the blank as the punch nose 19 moves downward and as the lower region of the blank is laterally confined against outward radial metal flow by the cavity wall 11.

Figure 9:
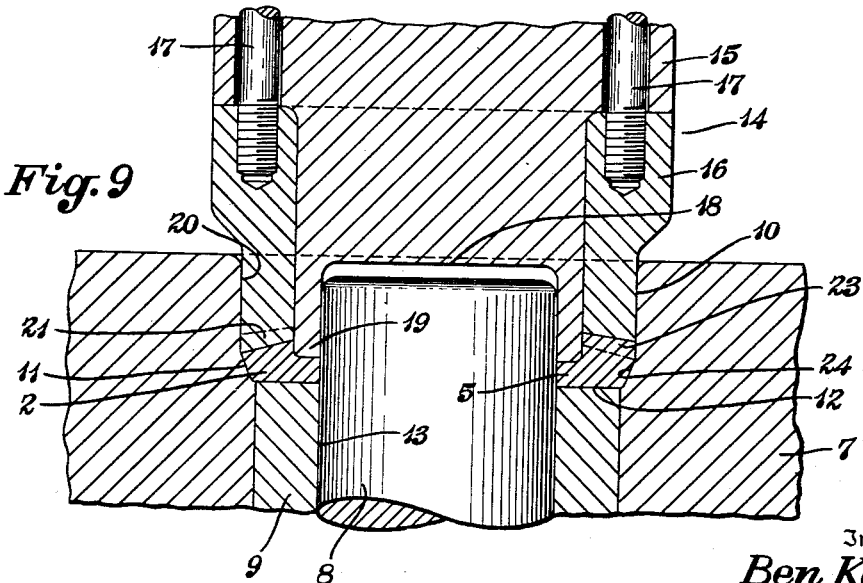
Fig. 9 is a view similar to Fig. 8, but illustrating the dies at the completion of the cold compression forming operation.

Downward movement of the punch 14 within the die cavity 6 from the position illustrated in Fig. 8 to the final position of the parts illustrated in Fig. 9 results in displacement and flow of the metal in the ring blank 1. Initially the punch nose 19 contacts the upper inner annular corner zone of the blank 1, tending to move the blank downward in the die cavity 6 and to displace the metal in the upper region of the blank 1 outwardly. This outward displacement or flow of the metal is resisted by the die cavity wall 10 when the upper portion of the blank has been displaced outwardly a sufficient amount to contact the walls 10, so that further downward movement of the punch tends to squeeze and compress the metal in the upper zone of the blank by the tendency of the annular nose 19 to enter within the space between the inner diameter of the blank 1 and the pilot 8. This compressive squeezing of the metal in the upper portion of the blank 1 may result in some slight backward extrusion of the metal therein which movement of the metal, however, will be resisted by the tooth formations 21 on the lower end of the associated downcoming outer punch member 16, which contacts and begins to work the metal in the upper surface of the blank just after the nose member 19 initially contacts the ring blank 1.

At the same time, the downward movement of the blank in the die cavity 6 initiated by the downward movement of the punch is resisted by the conical die cavity wall 11 against which the outer lower corner of the blank 1 is pressed, thus displacing the metal in the lower zone of the blank 1 inward as the blank is continued to be forced downward into the die cavity 6, resulting in inward displacement or flow of the metal in the blank 1 at the lower inner corner of the ring.

As the punch 14 continues to move downward, the tooth ridges of the tooth formation 21 on the lower end of punch member 16 enter into the top surface of the blank 1 and displace the blank metal below the ridges downward and slightly inward due to the angularity of the tooth formation. This metal displacement or flow is accompanied by some upward displacement of the metal in the upper zone of the blank 1 into the valleys of the tooth formations 21 on the end of outer punch member 16, so that accurate tooth formations are completely formed in the upper surface of the blank 1, as indicated at 23.

The downward movement of the blank 1 in the die cavity 6 also forms the blank with an outer lower conical surface indicated at 24. As the punch 14 moves to the limit of its movement, the metal in the blank displaced downward by the formation of the teeth 23 and displaced inward by the formation of the conical surface 24 flows downwardly and inwardly to fill out the remaining portion of the confined, ring-like die cavity 6 below the end of punch nose 19 and above the top surface 12 of the knock-out member 9 and outside of pilot member 8, thereby forming the inner gear flange 5 to the shape of the die cavity 6 as shown in Fig. 9.

The cold working of the blank 1 to form the gear 2 in the manner just described accurately sizes the ring gear and the teeth thereof, compresses and coins the metal therein, and forms very smooth, finished, cold worked surfaces on all surfaces of the ring gear 2 and teeth 23 thereof. The smoothness and finish of these surfaces is dependent upon the surface smoothness and finish of the die and punch surfaces which contact and work the metal.

Even though the ring blank 1 may be slightly out of round, the cooperative action of the punch nose 19 centered by the pilot 8, and the conical die cavity surface 11, as the metal is compressed, displaced, and cold worked between the punch and die, forms the gear to be truly round or concentric at all sections, and the cold working of the metal is accompanied by work hardening.

As previously indicated, the grain flow lines in the blank originating from the grain flow lines in the original bar from which the tube was formed, which tube in turn was cut into sections to provide the ring blanks 1, run axially of the blank. The displacement and flow of the metal in the blank as the gear 2 is formed turns, bends, and compresses the grain flow lines inward in the lower portion of the finished gear 2. The displacement and compression of the metal in the valleys of the tooth formations 23 in the finished gear also squeezes, bends, and compresses the grain flow lines or fibres without cutting or severing the same in the manner which occurs when gear teeth are cut by a machining operation. Furthermore, the grain flow lines in the ridges of the tooth formations are bent or compressed slightly from side to side of any tooth and follow the contour of the tooth cross section. This deformation of the grain flow lines occurs uniformly around the tooth annulus so as to not only strengthen the teeth but to provide teeth of uniform strength.

Upon withdrawal of the punch 14 from the die cavity 6, the formed gear 2 may be ejected from the die member 7 by the knock-out member 9, after which the gear may be subjected to a heat treating or case hardening operation, if desired or required, depending upon the necessary characteristics of the finished gear.

The initial work hardening and strengthening of the gear by cold working and the uniformity in the formation and strength of the teeth in the gear, accompanied by uncut grain flow lines and uniform concentricity in a cold worked metal body, all contribute to the maintenance of concentricity and lack of warpage in the gears 2 during heat treatment or case hardening. As a result, it is only necessary for completely finishing the gear to make an extremely light or minute finish grinding cut across the tooth surfaces in order to finish the gear. The metal loss during such a grinding operation is extremely small in amount and represents the only metal loss in the manufacture of the gear 2, so that the yield of finished material is exceedingly high.

In connection with the discoveries of the present invention which have led to the successful manufacture of precision formed gears 2 by cold working, I have discovered, with particular reference to Fig. 5, that if a thinner blank is used having the same amount of metal as in the blank 1, but having a smaller inner diameter approximately that of the inner gear flange 5 of the finished gear 2, the inner ends of the gear teeth do not fill out completely before sufficient work hardening develops to prevent further downward movement of the punch.

Furthermore, when the blank thickness is increased without increasing the inner diameter of the blank, the same character of result occurs; that is, incomplete fill out of the teeth at their inner ends. This inability to completely form the teeth of the gear in a blank having an inner diameter approximately the inner diameter of the finshed gear flange apparently results from the resistance or restriction to the flow of metal outward and upward around the effective shoulder formed by the punch nose 19 on the inner diameter of the gear, which metal if it did flow freely would fill out the inner ends of the gear teeth.

Thus, in accordance with the present invention these difficulties are overcome by providing for forming the valleys of the tooth formation in the finished gear downward in the top surface of the blank accompanied by some upward displacement of the metal in the tooth ridges in order to fill out the tooth formation at the inner ends of the teeth; by providing for downward and inward flow or displacement of metal in the blank below the formed teeth to fill out and form the inner gear flange 5 which is the web portion of the gear in which the hub hole is formed; and by initiating said downward and inward flow or displacement of metal by the flow or displacement of metal downward incident to downwardly forming the teeth in the top surface of the blank.

In order to carry out such procedure which characterizes the present invention, the blank size and cross-sectional shape is related to the finished cross-sectional shape of the gear so that the blank thickness 3 approximates the mean thickness of the gear, and the outer diameter of the blank approximates the mean outer diameter of the gear, and the inner blank diameter is larger than the inner diameter of the gear.

Figure 6:
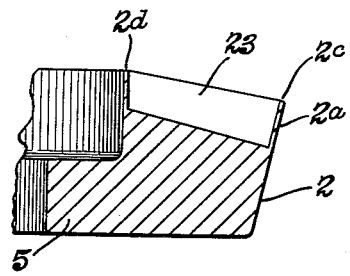
Fig. 6 is a view similar to Fig. 5 of a modified form of resultant product.
Figure 3:
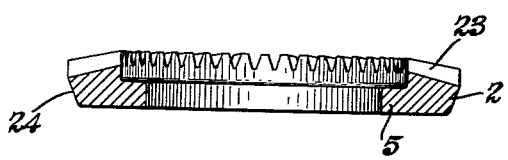
Fig. 3 is a sectional view similar to Fig. 2, illustrating the improved cold formed bevel gear product of the present invention.

I have further discovered that if the outer ends of the gear teeth are angled or formed as a continuation (Fig. 6) of the conical surface 2, as at 2a, rather than being formed cylindrical, as indicated at 2b in Fig. 5, a very thin fin 2c, illustrated in an exaggerated manner in Fig. 6, is formed across the ends of the valleys between teeth which fin connects the ends of the tooth ridges. If it is desired to form a similar fin 2d at the inner ends of the teeth, this may be accomplished by providing a slight clearance between the inner ends of the tooth formations 21 on the outer punch 16, and the outer cylindrical surface of the punch nose 19. However, these fins 2c and 2d are so thin that they are unobjectionable since the same light finish grinding cut which may be made to finish the gear teeth will at the same time remove such fins without any substantial loss of metal.

The cold formed steel bevel gears made in accordance with the present invention have precision formed, cold worked, smooth surfaces, have a sound, strong, and dense metal structure, and have uncut grain flow lines throughout. Etched sections of the gear show a very fine grain structure. The work hardening of the metal in the gear incident to cold working gives Rockwell hardness values of 95 to 100 (B Scale). In the case of automotive gears wrich require special heat treatment for file hardness (Rockwell C-65), cold pressed gears can be processed with the same equipment used for machined gears.

Accordingly, the present invention provides a new and different procedure for the manufacture of precision bevel gears wherein substantially no metal loss occurs, wherein only a few operations are required, wherein warpage incident to heat treatment is substantially eliminated, wherein a high yield of finished material is obtained, wherein finished grinding where required does not involve the difficulties heretofore present in the manufacture of bevel gears, wherein strong and uniform strength gear teeth are provided, and wherein prior art difficulties are overcome or eliminated and long standing problems in the art are solved.

In the foregoing description, certain terms have been used for brevity, clearness, and understanding; but no unnecessary limitations are to be implied therefrom beyond the requirements of the prior art, because such terms are utilized for descriptive purposes herein and not for the purpose of limitation and are intended to be broadly construed. Thus, whenever a bevel gear is referred to herein, such term is intended to include not only bevel gears, but spiral bevel and hypoid gears. Similarly, the cold working of the metal under compression as referred to herein is intended to include the cold working of metal under compression in an ultimately confined cavity in which the metal is coined, extruded, or displaced, or otherwise flows in a desired manner to form a finished article from a single metal blank without appreciable metal loss.

Moreover, the description of the improvements is by way of example and the scope of the present invention is not limited to the exact details illustrated, nor to the specific articles shown.

Having now described the features, discoveries, and principles of the invention, the operation and procedure of the preferred method, the characteristics of the new articles, and the advantageous new and useful results obtained thereby; the new and useful products, methods, steps, operations, procedures, discoveries, and principles, and mechanical equivalents obvious to those skilled in the art, are set forth in the appended claims.

I claim:

1. The method of cold working a ring-like steel blank without metal loss to form a bevel ring gear including the steps of providing a steel ring blank having a rectangular shape in radial cross section and having axially extending grain flow lines, laterally confining and inwardly directing movement of the metal in the lower annular region of the blank; axially compressing and enlarging the inner and outer diameters of the upper annular region of the blank; then further axially compressing while laterally confining the enlarged diameter metal in the upper annular region of the blank to displace metal and form gear tooth valleys downward in the upper region of the blank and to displace other metal in the blank inward in the lower region of the blank to form an inturned web flange, thereby axially endwise compressing and laterally squeezing said grain flow lines to provide gear teeth having uncut, bent, generally axially extending grain flow lines therein.

2. The method of making a bevel ring gear including the steps of providing a ring-like steel blank having a rectangular shape in radial cross section, laterally confining and inwardly directing movement of the metal in the lower end of the blank; applying axial pressure to the top portion of the blank; said axial pressure first outwardly displacing metal in the upper end of the blank to enlarge the inner and outer diameters of the upper portion of the blank; said axial pressure then laterally squeezing, and upwardly and downwardly displacing metal under lateral confinement in the upper end of the blank to form bevel ring gear teeth therein; and said axial pressure also displacing metal in the lower portion of the blank downward and inward to form an inturned web flange at the lower inner corner of the blank.

References Cited in the file of this patent

UNITED STATES PATENTS

| | | |
|---|---|---|
| 600,994 | See | Mar. 22, 1898 |
| 637,655 | Parish | Nov. 21, 1899 |
| 1,332,968 | Beall | Mar. 9, 1920 |
| 1,354,779 | Rydbeck | Oct. 5, 1920 |
| 1,360,358 | Beall | Nov. 30, 1920 |
| 1,454,508 | Eckert | May 8, 1923 |
| 2,116,804 | Swanson | May 10, 1938 |
| 2,285,575 | Elbertz | June 9, 1942 |
| 2,337,222 | Ammon | Dec. 21, 1943 |